United States Patent [19]

Dey

[11] 4,053,692
[45] Oct. 11, 1977

[54] HERMETICALLY SEALED CELLS

[75] Inventor: Arabinda N. Dey, Needham, Mass.

[73] Assignee: P. R. Mallory & Co., Inc., Indianapolis, Ind.

[21] Appl. No.: 664,781

[22] Filed: Mar. 8, 1976

Related U.S. Application Data

[63] Continuation-in-part of Ser. No. 314,316, Dec. 12, 1972, Pat. No. 3,945,846, and Ser. No. 664,780, March 8, 1976.

[51] Int. Cl.² .................................................. H01M 2/02
[52] U.S. Cl. ..................................... 429/171; 429/174; 429/181; 429/185; 429/186
[58] Field of Search ................. 136/83 R, 162, 133; 429/171–173, 174, 178, 180, 181, 185, 186

[56] References Cited

U.S. PATENT DOCUMENTS

| 2,727,082 | 12/1955 | Chubb et al. | 136/30 |
| 3,269,868 | 8/1966 | Carson, Jr. | 136/114 |
| 3,475,226 | 10/1969 | Fraioli | 136/162 |
| 3,645,792 | 2/1972 | Hacha | 136/83 R X |
| 3,749,607 | 7/1973 | Jasinski et al. | 136/83 R |
| 3,918,992 | 11/1975 | Will et al. | 136/83 R |
| 3,945,846 | 3/1976 | Dey | 136/100 R |
| 3,946,751 | 3/1976 | Breiter et al. | 136/83 R X |

Primary Examiner—C. F. Lefevour
Attorney, Agent, or Firm—Ronald S. Cornell; Israel Nissenbaum; Charles W. Hoffmann

[57] ABSTRACT

Hermetic closure for electrochemical cells utilizing glass to metal seals in combination with electrolyte introduction means. A hollow tube anode current collector is sealed to a glass ring which is sealed to a metal outer ring.

13 Claims, 3 Drawing Figures

U.S. Patent  Oct. 11, 1977  4,053,692
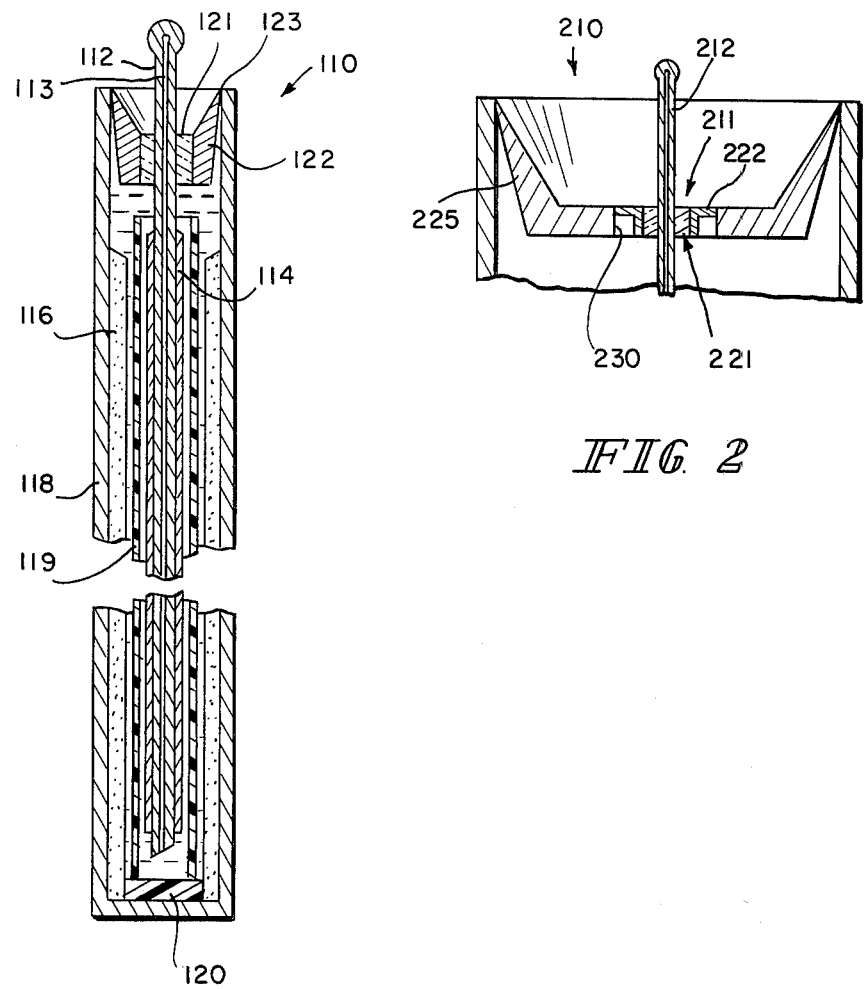
FIG. 1
FIG. 2
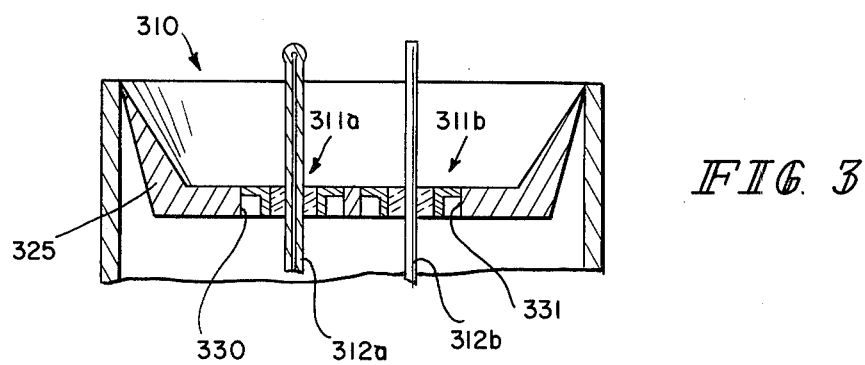
FIG. 3

HERMETICALLY SEALED CELLS

This application is a continuation-in-part of my copending applications Ser. No. 314,316, filed Dec. 12, 1972, and now U.S. Pat. No. 3,945,846 and Ser. No. 664,780, filed Mar. 8, 1976.

This invention relates to means for filling and hermetically sealing electric cells and more particularly to ultraminiature cylindrical cells utilizing a lithium anode and a high energy density cathode material.

In my copending application Ser. No. 664,780 I described an ultraminiature cell which is useful in many applications where space limitations make such an ultraminiature cell especially beneficial. The invention described therein utilizes the high energy content that can be obtained with a lithium-silver chromate system. That application was directed to construction of miniature cells and to a method of making such miniature cells having dimensions on the order of a diameter of 0.1 inch and a length of 0.75 inch and to cells with a volume up to 0.01 inch$^3$. In the cells disclosed therein, advantage is taken of the high energy content that can be disposed, in this small volume, by using a lithium anode and a silver chromate cathode.

However, one of the major problems in manufacturing any closed electric cell is encountered in sealing the cell. In the construction of a miniature cell of the dimensions here involved, the sealing problem is especially difficult. Moreover, the presence of lithium or any other chemically active alkali metal as an element or component in the cell requires that all of the assembly work be done in a dry atmosphere since the presence of any water would introduce hazardous conditions because of the extreme activity of lithium in the presence of moisture. The necessity of assembling and sealing the cell in a dry atmosphere introduces complications in the handling, the sealing and the filling operations.

The present invention provides both a design construction and a method of assembly and filling which assures the formation and maintenance of an hermetic seal, and which permits filling an already sealed cell container without destroying the seal. The resulting cell will maintain hermeticity and prevent leakage of volatile electrolyte, thereby retaining the electrolyte needed for the proper performance of the cell.

In accordance with one embodiment of the invention, described in my copending application Ser. No. 664,780 the ultraminiature cell is constructed with a container casing formed from thin hollow tubing on whose inner surface a porous layer of an active cathode material such as silver chromate ($Ag_2CrO_4$) is formed.

A small, elongated, cylindrical anode of lithium metal is formed around a linear, metallic hollow tube which is used as current collector, as support for the lithium, and as electrolyte fill port. The anode thus formed is enwrapped in one or more layers of thin, insulating, separator material, such as microporous polypropylene, and this assembly of anode and separator is then axially inserted into the axially disposed space within the surrounding cylindrical cathode layer.

In order to seal the ultraminiature cells of the present invention, the outer extending end of the anode collector tube is anchored in a cell top by a glass to metal seal, prior to or during the preparation of the lithium anode. The hollow tube or needle is joined by an insulative glass member or ring to a metal ring, which can be either the entire cell top or just a portion thereof (in larger cells). The metal ring is hermetically sealed to the cell casing or to the cell top itself if the metal ring is only a portion thereof.

The hollow tube serves both as the filling conduit and as an anode collector pin which supports the body of the lithium anode material, and is permanently disposed and sealed in the cell top. After the cell has been filled with the desired amount of electrolyte the input end of the hollow needle, outside of the cell, is closed off and welded at its outer end. This completes the seal for the cell.

The construction of the cell, and the method of forming, sealing and filling the cell are explained in more detail in the following specification and are illustrated in the accompanying drawings in which;

FIG. 1 is a vertical cross-section view of a cell utilizing a glass to metal seal as the hermetic closure and cell top.

FIG. 2 is a second embodiment of a glass-to-metal hermetic seal for an electrochemical cell.

FIG. 3 is a third embodiment of the invention wherein the cell has two glass-to-metal feed throughs.

In the embodiment of the invention shown in FIG. 1 a glass to metal seal is used to hermetically seal a cell 110 having a hollow tantalum tube 112 which acts as current collector for a concentric, axially disposed lithium anode 114. Tube 112 extends beyond both ends of the anode. A concentric $Ag_2CrO_4$ cathode 116 is supported on the inner wall surface of an enclosing cylindrical, stainless steel can 118, with the lithium anode 114 and the cathode 116 being separated by an insulating separator 119. The upper end of the hollow tube anode current collector 112 is sealed to a glass ring section 121 which is, in turn, surrounded by and sealed to a stainless steel metal outer ring 122. The glass to metal bonds between the glass ring 121 and both the metal tube 112 and the metal ring 122 are hermetic and do not allow any electrolyte seepage to the exterior of the cell.

The materials comprising the metal can 118 and the hollow tube feedthrough 112 must be compatible with the particular cell components with which they are in contact and additionally the tube metal should be able to form glass to metal seals. Thus, if the hollow feedthrough 112 acts as the anode current collector for an alkali metal such as lithium, the particular component metals which are compatible with such active anode materials include copper, iron, steel, stainless steel of all types, nickel, titanium, tantalum, molybdenum, vanadium, chromium and tungsten. The metals which are compatible with a sulfur dioxide active cathode material such as that disclosed in my parent application now U.S. Pat. No. 3,945,846, and which can provide a useful cathode current collector in a Li/$SO_2$ cell system include aluminum, titanium, tantalum, molybdenum, vanadium, chromium, tungsten (all valve metals), gold and platinum. Compatible metals for silver chromate active cathode materials disclosed in my copending application Ser. No. 664,780 include titanium, tantalum, molybdenum, vanadium, chromium, tungsten (all valve metals except aluminum), gold, platinum and stainless steel. Though the metals enumerated for the sulfur dioxide and the silver chromate materials are useful as the outer can materials when the anode is placed upon the hollow feed through, the positions and hence the materials can be reversed when the cathode material is placed on the hollow feedthrough as described in my copending application Ser. No. 664,780.

A requirement of the seal of the present invention is that there be compatibility between the metal and glass members. This involves a consideration of the relative coefficients of expansion of these two components. Tantalum for example, has a coefficient of thermal expansion of about $70 \times 10^{-7}$ inches per inch per ° C. The coefficient of expansion of the glass member may be somewhat greater or somewhat less than the coefficient of expansion of the metal member. Thus in the case of tantalum the coefficient of expansion of the glass may be as low as about $50 \times 10^{-7}$ inches per inch per ° C, or as high as about $100 \times 10^{-7}$ inches per inch per ° C. Preferably, however, for tantalum the coefficient of expansion of the glass should be between about 55 and about $90 \times 10^{-7}$ inches per inch per ° C.

Depending upon whether the coefficient of expansion is larger, smaller or about the same as the metal member, the resulting seal may be respectively compression, tension or matched. All three of these types of seals are within the scope of the present invention.

Most preferably, the coefficient of thermal expansion of the glass is between 60 and $80 \times 10^{-7}$ inches per inch per ° C for tantalum.

The glass also must have the property that it is essentially unattacked by the materials contained in the cell.

Any glass meeting the foregoing requirements may be utilized in accordance with the present invention. One exemplary glass has been found to contain predominately silicon oxide and minor amounts of sodium oxide, potassium oxide, and additional oxides in even smaller amounts including one or more of chromium oxide, manganese oxide, cobalt oxide, lead oxide and/or calcium oxide. Manganese oxide, chromium oxide, cobalt oxide, silver oxide, lead oxide, calcium oxide, and zinc oxide are optional substances and in some applications one or more of these substances may not be required. Furthermore, it will be apparent to those skilled in the art that many other glasses either having some or all of the foregoing oxide constituents or different oxide constituents, which have the necessary properties of coefficient of expansion and resistance to electrolyte attack may be used in the present invention.

The trade name of one exemplary glass meeting the foregoing requirements is Fusite Type GCS.

The stainless steel outer ring 122 has a larger coefficient of expansion than that of the tantalum thereby providing a compression seal, although other metallic combinations may provide matched or tension seals.

The glass to metal seal is desirably formed prior to the application of the lithium anode 114 to the tube 112 by placing an annular glass preform having the above-mentioned characteristics and being of sufficient size to closely fit within the space between the tantalum tube 112 and the outer stainless steel ring 122. The assembly of tantalum tube, steel ring and glass preform is heated to about 1000° C to melt the preform and to render the viscosity of the glass such as to cause the molten glass to flow and when cooled to provide the glass member 121. The glass of glass member 121 bonds to the stainless steel ring 122 and the metal tube 112 so as to form an integrated metal-to-glass-to-metal seal.

Though the tube and ring members have been described as being tantalum and stainless steel respectively other metals as described above can be similarly used with an appropriately matched expansion glass material.

The application of lithium to the tube is accomplished in the manner described in any copending application Ser. No. 664,780 and the entire sub-assembly comprising rod 112 having rings 121, 122 and anode 114 secured thereto is then fitted into the cell cavity formed in the cathode, also as described above. The sub-assembly is welded to the container 118 at its upper periphery by suitable means such as electron beam or laser welding, with the weld being effected between the steel container 118 and the metal ring 122 at their point of contact 123. The metallic outer ring 122 is in the shape of a truncated cone having a concave base, with the periphery of the base of the ring 122 sized to fit the open end of the container 118 at its upper periphery 123 so that only a minimal point of contact is made between the ring 122 and the container 118 to thereby minimize cell component damage that could be caused from the heat of welding.

This is an especially important feature in small cells because of rapidity of heat transfer in such cells. The electrolyte (1M $LiAlCl_4$ in an equivolume mixture of tetrahydrofuran and propylene carbonate) is introduced into the cell by injection, as with a syringe, through the fluid passage 113 in rod 112.

The rod 112 is of greater length than anode 114 and extends completely therethrough so that a predetermined amount of electrolyte fluid can be introduced through the hollow tube 112 (e.g. by means of a syringe) to exit from the bottom of said tube 112 into the operating space between the lithium anode 114 and the cathode 116. After the filling operation, the combination tube and anode collector is separated from the filling source, closed above the glass to metal assembly, and sealed by tungsteninert gas (TIG) welding in the manner described in my copending application Serial No. and now U.S. Pat. No. 3,945,846 in which a welder with a tungsten cathode is positioned just above the hollow tube end to be sealed, a gas is passed through said electrode, and, on triggering the welder, hot gas melts the tip of the tube to form a round bead of metal thus sealing the tube.

In a second embodiment of the invention shown in FIG. 2 wherein the cell is larger than cell 110 of FIG. 1, a glass to metal, hollow tube, feedthrough assembly having a tube 212, a glass sealing member 221 and an outer metal ring member 222 is only a part of cell top 225. Top 225 has a preformed, opening 230 concentrically positioned thereon into which sealing assembly 211 is placed. Once assembly 211 is properly positioned it is attached by welding or other similar means to the cell top 225 at the periphery of the opening 230. The other components of the cell can be placed in the cell in the same manner as described with reference to Example 1.

In another embodiment of the invention, shown in FIG. 3, there is provided a versatile cell 310 which is capable of use with a container formed of a material which is not compatible with the active cell components (for example, the electrolyte when in contact with a lithium anode). Such incompatible materials include the following metals: aluminum, zinc, tin, magnesium, gold, platinum and silver. It is possible to use such material by providing two glass to metal feedthroughs as shown in FIG. 3 so that it is unnecessary to use the cell container as a terminal. In this embodiment, the cell top 325 has two preformed open circular areas 330 and 331 for the accomodation of two glass to metal feedthrough assemblies 311a and 311b. Only one feedthrough 311a is shown as being hollow for use as means for introduction of the electrolyte solution. The other feedthrough 311b is shown as a solid rod, but both feedthroughs can have fluid passageways therein if desired. In this way, and depending on the location of the materials with the cell, one of the feedthroughs becomes the negative terminal when in contact with the anodic material, and the other becomes the positive terminal when in contact with the cathodic material. In this embodiment the container does not operate as a current collector and is not in contact with the corrosive cell materials. Accordingly, metals such as aluminum can be used in the formation of the cell container. Though not shown in the drawing, the electrode materials are not placed directly upon rods 312a or 312b which function as terminals for the electrode but not as current collectors, and the cell components are separated from the container walls by one or more insulating separators. Suitable electrode materials for this type of cell would include spirally wound layers of alternate lithium and carbonaceous ribbons with an $SO_2$ or thionyl chloride solution.

While the above disclosure has described the invention with reference to lithium, it will be obvious that other anode materials, such as the active metals of Groups IA, and IIA, can also be used. In addition it will be recognized by these skilled in the art that many organic electrolyte solvents may be used. For example organic solvents that may be used include tetrahydrofuran, propylene carbonate, dimethyl sulfite, dimethyl sulfoxide, N-nitrosodimethylamine, gamma-butyrolactone, dimethyl carbonate, methyl formate, butyl formate, dimethoxyethane, acetonitrile and N:N dimethyl formamide, and electrolyte salts for such cells include light metal salts such as perchlorates, tetrachloroaluminates, halides, hexafluophosphates and hexafluoarsenates.

What is claimed is:

1. An electrochemical cell having an hermetic seal assembly for closing the open end of the container for said cell; said hermetic seal assembly comprising a metal rod, a ring shaped glass member permanently concentrically sealed to said metal rod at its upper end, and a metal member permanently sealed to said glass member; said metal rod extending axially within said cell, having liquid passage means therethrough and being an electrical terminal for said cell and an electrolyte fill port, with the upper end of said rod having been permanently closed after the introduction of said electrolyte to close said liquid passage; said metal rod being in contact with an active electrode material of said cell and being formed of a metal which is different from but chemically compatible with said active electrode material; said glass member having a thermal coefficient of expansion substantially similar to said metal comprising said tube; and said glass member being inert with respect to material contained within said cell; and said metal member being hermetically permanently sealed to said container at said open end.

2. An electrochemical cell as in claim 1 wherein said metal rod is an anode current collector and said active electrode material is an alkali metal.

3. An electrochemical cell as in claim 1 wherein said metal rod further acts both as support and current collector for an active electrode material.

4. An electrochemical cell as in claim 1 wherein said metal member is in the shape of a truncated cone having a concave base, with said base facing the closed outer end of said rod, the periphery of said base being sized to fit the open end of said container, said periphery of said base and the edge of said container at its open end being hermetically sealed to one another.

5. An electrochemical cell as in claim 1 wherein said metal member is a ring peripherally, hermetically sealed to an end closure for said electrochemical cell, said closure having a preformed opening sized to accomodate said metal ring.

6. An electrochemical cell as in claim 2 wherein said alkali metal is lithium.

7. An electrochemical cell as in claim 6 wherein said metal rod is formed of tantalum.

8. An electrochemical cell as in claim 7 wherein said glass has a thermal expansion coefficient between 60 and $80 \times 10^{-7}$ inches per inch per ° C.

9. An electrochemical cell as in claim 8 wherein said metal member is comprised of stainless steel.

10. An electrochemical cell as in claim 3 wherein said metal rod extends beyond said active electrode material and said liquid passage terminates in an opening beyond said active electrode material.

11. An electrochemical cell as in claim 4 wherein said periphery of said base and said edge of said container are hermetically sealed to each other by welding.

12. An electrochemical cell as in claim 11 wherein a second metal member is hermetically sealed into a second preformed opening in said end closure, said second metal member having a second ring shaped glass member fitted and sealed into an opening therein, the opening in said second glass member having a second metal rod extending therethrough and sealed thereto.

13. An electrochemical cell as in claim 12 wherein said second metal rod is solid.

* * * * *